Feb. 12, 1929.
C. C. BLACKMORE
1,701,556
OIL FILTER
Filed Nov. 12, 1926
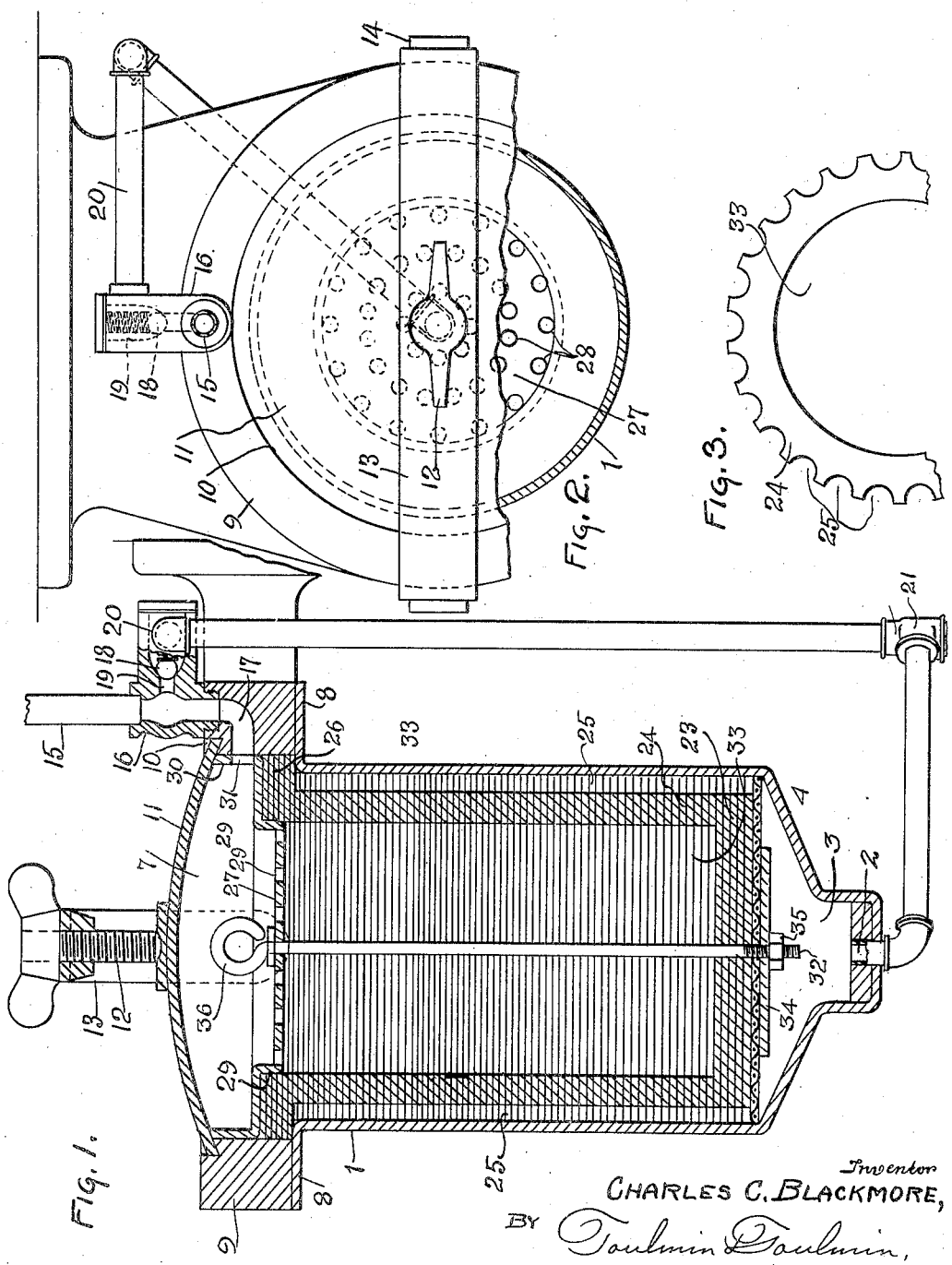
Inventor
CHARLES C. BLACKMORE,
BY Toulmin & Toulmin,
Attorneys Patented Feb. 12, 1929.

1,701,556

UNITED STATES PATENT OFFICE.

CHARLES C. BLACKMORE, OF DAYTON, OHIO.

OIL FILTER.

Application filed November 12, 1926. Serial No. 147,894.

My invention relates to oil filters particularly adapted for use on automotive engines.

It is the object of my invention to provide a filter which can be constructed cheaply, making it suitable for quantity production for automobiles, which will operate under varying conditions of temperature and which will by-pass oil in case the filtering medium becomes clogged by refuse material or congealing of the oil.

It is a further object to provide detachable, replaceable filtering mediums which may be removed and similar new mediums installed with the minimum of inconvenience to the user, so that the same case may be used throughout the life of the engine, while replaceable filtering mediums may be installed from time to time as conditions demand.

Referring to the drawings:

Figure 1 is a sectional view of my filter;

Figure 2 is a plan view thereof partially broken away;

Figure 3 is a plan view of the filtering medium unit.

Referring to the drawings in detail, 1 designates a drawn steel case having an exit pipe 2 leading from the bottom of the case where there is provided a space 3 for the accumulation of oil to facilitate its free exit beneath the supporting screen 4. This screen may be detachable as in Figure 1.

Mounted upon the screen 4 is the filter paper designated by the numeral 23, the oil being adapted to enter the filtering medium passing down therethrough from the reservoir space 7 at the top of the case 1. The case 1 is provided with an outwardly turned flange 8 on which is mounted a die cast ring 9. Within the shoulder 10 of this ring is mounted a steel cap plate 11 which is held in position by a screw 12 mounted in a bail 13 which is pivoted at 14 on the ring 9.

Normally, the oil will pass from the inlet line 15 through the passageway 17 into the filter, but, in the event that there is a congestion in the filter, the oil pressure will build up sufficiently to unseat the spring pressed ball 18 in the by-pass passageway 19, allowing the oil to pass out through the by-pass pipe 20 to the exit line 2 which it joins at 21.

Resting on the screen 4, which is a horizontal disk, are a plurality of filter sheets generally designated 23 and mounted above these sheets are a plurality of rings of paper 24 having semi-circular spaced portions 25 cut therefrom on the exterior thereof, so that passageways are formed through these cutaway portions 25 for the oil which passes through the rings 24. A second series of uncut ring sheets 26 is provided on the top of this stack of filter papers. A ring is mounted on the top thereof for holding them in position, such ring having a central portion 27 with apertures 28 beneath the oil reservoir 7. It is also provided with a shoulder 29 that aligns the sheets 26, and a vertical ring portion 30 having apertures 31 for the entrance of oil into the filter.

This ring carries a rod 32 which passes down through the central filter chamber 33 through the sheets 23, the screen 4 and engages with a plate 34 and nut 35 so that when the cover 11 is lifted, the entire filtering unit consisting of the sheets 23, 24 and 26 may be removed and a new unit substituted therefor. This rod 32 is provided with an eye 36 which facilitates the removal as by a hook so that the hands of the operator will not become soiled through the accumulation of sludge on the filter from the oil.

It will be understood that I desire to comprehend within my invention such modifications as may be necessary to adapt it to varying conditions and uses.

Having thus fully described my invention, what I claim as new and desire to secure by Letters Patent, is:—

1. In an oil filter, a case, a ring mounted on said case having an inlet line, a bail pivoted on said ring, means on said bail for engaging a detachable cover and a cover supported by said ring and a filtering medium mounted within said case, said filtering medium being cup-shaped and formed by a plurality of layers of filter paper.

2. In a filter, a case and a filtering body comprising a plurality of superimposed layers of filter paper having an interior space, means for holding the layers in place and aiding in the filtering, means of delivering oil to the interior space and removing it after it has passed through the filter paper, and means attached to the filtering body to facilitate its installation and removal bodily.

3. In a filter, a case, means of delivering oil and removing it therefrom at either end thereof, a filtering medium interposed therebetween comprising a cup-shaped body composed of a plurality of layers of filter paper into which the oil is delivered having a plurality of spaced grooves on the exterior thereof adjacent the case through which the oil can make its exit.

4. In a filter, a case, means of delivering oil and removing it therefrom at either end thereof, a filtering medium interposed therebetween comprising a cup-shaped body composed of a plurality of layers of filter paper into which the oil is delivered having a plurality of spaced grooves on the exterior thereof adjacent the case through which the oil can make its exit, and means attached to said filtering body to facilitate its installation and removal bodily.

5. In a filter, a case, means of delivering oil and removing it therefrom at either end thereof, a filtering medium interposed therebetween consisting of a cup-shaped body into which the oil is delivered, and means attached to said filtering body to facilitate its installation and removal bodily, said means consisting of a supporting body plate, a foraminous top plate and means connecting said plates to one another together with means mounted thereon which can be grasped for removing the filtering medium from the case.

6. In a filter, a case, a plate supported in said case, a filtering medium supported by said plate and composed of a cup-shaped body formed of a plurality of layers of filter paper, and means for holding the layers of filter paper in place and to facilitate the removal of said filtering medium from the case.

7. In a filter, a case, a foraminous plate supported by said case, filtering medium supported by said plate comprising a cup-shaped body formed of a plurality of layers of filter paper, a perforated plate mounted upon said filtering medium, and means passing through said perforated plate and said plate to hold the sections of filter paper together and to provide means for the removal of said filtering medium from the case.

In testimony whereof, I affix my signature.

CHARLES C. BLACKMORE.